(12) United States Patent  
Altmann et al.

(10) Patent No.: US 9,274,992 B2  
(45) Date of Patent: Mar. 1, 2016

(54) CABLE WITH CIRCUITRY FOR COMMUNICATING PERFORMANCE INFORMATION

(71) Applicant: Lattice Semiconductor Corporation, Portland, OR (US)

(72) Inventors: William C. Altmann, San Jose, CA (US); Gyudong Kim, Sunnyvale, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 0 days.

(21) Appl. No.: 14/322,753

(22) Filed: Jul. 2, 2014

(65) Prior Publication Data

US 2015/0026366 A1    Jan. 22, 2015

Related U.S. Application Data

(60) Provisional application No. 61/856,600, filed on Jul. 19, 2013.

(51) Int. Cl.
*G06F 3/00* (2006.01)
*G06F 13/40* (2006.01)
*H04B 11/00* (2006.01)
*H04L 5/00* (2006.01)

(52) U.S. Cl.
CPC ............ *G06F 13/4022* (2013.01); *H04B 11/00* (2013.01); *H04L 5/00* (2013.01)

(58) Field of Classification Search
None
See application file for complete search history.

(56) References Cited

U.S. PATENT DOCUMENTS

| | | | | |
|---|---|---|---|---|
| 6,131,125 | A  * | 10/2000 | Rostoker et al. | 709/250 |
| 2005/0182876 | A1* | 8/2005 | Kim et al. | 710/100 |
| 2009/0030635 | A1* | 1/2009 | Horan et al. | 702/85 |
| 2009/0109336 | A1 | 4/2009 | Watanabe et al. | |
| 2010/0283532 | A1* | 11/2010 | Horan et al. | 327/530 |
| 2011/0038368 | A1 | 2/2011 | Binder | |
| 2012/0289080 | A1* | 11/2012 | Huang et al. | 439/502 |
| 2013/0086297 | A1 | 4/2013 | Siulinski et al. | |
| 2014/0119423 | A1* | 5/2014 | Boccaccio et al. | 375/232 |

FOREIGN PATENT DOCUMENTS

| | | |
|---|---|---|
| KR | 10-0174039 B1 | 3/1999 |
| KR | 10-2013-0026067 A | 3/2013 |

OTHER PUBLICATIONS

PCT International Search Report and Written Opinion, PCT Application No. PCT/US2014/046221, Oct. 27, 2014, 11 pages.

* cited by examiner

*Primary Examiner* — David E Martinez
(74) *Attorney, Agent, or Firm* — Fenwick & West LLP (57) ABSTRACT

A cable with circuitry that enables the cable to communicate data in one of at least two different signal modes of operation is presented. In a first signal mode, the cable enables data communication between the circuitry and either a source device or a sink device. The first signal mode can be used either to communicate properties of the cable itself or of a signal passing through the cable to either the source device or the sink device. In a second signal mode, the cable enables data communication between the source device and the sink device. The second signal mode can be used to communicate data in accordance with a predetermined protocol.

25 Claims, 10 Drawing Sheets

CABLE WITH CIRCUITRY FOR COMMUNICATING PERFORMANCE INFORMATION

CROSS-REFERENCE TO RELATED APPLICATION

This patent application claims priority to a provisional U.S. patent application No. 61/856,600, filed on Jul. 19, 2013, which is incorporated by reference herein in its entirety.

BACKGROUND

1. Field of the Disclosure

This disclosure pertains in general to a cable for communicating data between a transmitter and a receiver, and more particularly to a cable that includes circuitry for communicating performance information with either the transmitter or the receiver.

2. Description of the Related Art

Video and audio data is typically transferred from one device to another across using communication links (e.g., wired or wireless links) with protocols such as high definition multimedia interface (HDMI) or mobile high-definition link (MHL). Wired communication links can include cables comprising one or more conductors for communicating data between devices. Cables used for the wired communication links are selected based on, among other features, a power handling capability (at both a source end and sink end of the cable).

While some interface standards can provide a mechanism for the cable between a source device and a sink device to identify itself as being a compliant device for that interconnect (e.g. MHL), there are no current solutions for an interconnect to indicate to another device—either a source device or a sink device—whether a performance parameter of the interconnect is within a performance range of that interface standard. For example, if an interface standard allows a sink to provide 5 Volts at up to 1 Ampere to a connected source, then the cable is expected to be able to electrically handle signals up to 5 Watts. A cable with a power handling capacity of less than 5 Watt would not be able to support such standard and would not be able to indicate its inability to a coupled device because it lacks any such means to indicate such limitation to the coupled device.

Cable length, for example, can be a marketable feature. The longer the length of a cable the more difficult for the cable to maintain the quality of signals being carried through the cable. Therefore, to be able to use longer cables effectively, there is a need for a mechanism through which a cable can identify itself to and/or indicate to a coupled device that the cable has one or more limitations with respect to performance requirements as required by a particular interface standard.

SUMMARY

Embodiments of the present disclosure relate to a cable that includes circuitry for communicating performance information with either the transmitter or the receiver. The cable is coupled between a transmitter and a receiver for multimedia communications. The cable includes a set of conductors extending from one end of the cable to couple with the transmitter to another end of the cable to couple with the receiver and a switch coupled to at least one of the set of conductors. The cable also includes a circuit coupled to the switch and configured to control the switch to transition the cable from a first signal mode to a second signal mode, a path established via the set of conductors in the first signal mode to communicate first data between the circuit and either the transmitter or the receiver, and another path established via the set of conductors in the second signal mode to communicate second data between the transmitter and the receiver.

In one embodiment, the cable's circuit controls the switch to transition the cable from the second signal mode to the first signal mode.

In one embodiment, the cable can be transitioned from the first signal mode to the second signal mode at a predetermined time interval.

In one embodiment, the cable can be transitioned from the second signal mode to the first signal mode at a predetermined time interval.

In one embodiment, the switch is controlled by either the receiver or the transmitter.

In one embodiment, the circuit may cause the switch to disconnect at least one of the set of conductors between the transmitter and the receiver in the first signal mode.

In one embodiment, the circuit causes the switch to couple at least one of the set of conductors with the circuit in the first signal mode.

In one embodiment, the first data includes information derived from a measurement of at least one property of a signal passing through the set of conductors.

In one embodiment, information derived from a measurement of at least one property of the signal passing through the set of conductors includes at least one of: voltage level, current level, power of the signal, frequency components of the signal, attenuation components of the signal, and a degree of skewing of the signal.

In one embodiment, the first data includes information associated with at least one characteristic of the cable, the at least one characteristic of the cable including at least one of: impedance, length, operable frequency range, measured degree of crosstalk between the set of conductors, electromagnetic interference, and common-mode radiation.

In one embodiment, the first data can be stored in a memory of the circuit during manufacturing of the cable.

In one embodiment, the cable includes a voltage regulator configured to convert a voltage level of a signal carrying the second data from a first voltage level to a second voltage level.

In one embodiment, the end of the cable coupled to either the transmitter or the receiver is further configured to couple with the transmitter or the receiver through a coupling with a second cable.

Embodiments also relate to a method of communicating data between a transmitter of a first device and a receiver of a second device over a cable. The first data is communicated in a first signal mode of the cable between a circuit of the cable and either the transmitter or the receiver, the cable configured to couple with the transmitter at one end and the receiver at another end via a set of conductors of the cable. The cable transitions from the first signal mode to a second signal mode by turning on or off a switch of the cable and communicating second data in the second signal mode between the transmitter and the receiver.

BRIEF DESCRIPTION OF THE DRAWINGS

The teachings of the embodiments disclosed herein can be readily understood by considering the following detailed description in conjunction with the accompanying drawings.

DETAILED DESCRIPTION

The Figures (FIGS.) and the following description relate to various embodiments by way of illustration only. It should be noted that from the following discussion, alternative embodiments of the structures and methods disclosed herein will be readily recognized as viable alternatives that may be employed without departing from the principles discussed herein. Reference will now be made in detail to several embodiments, examples of which are illustrated in the accompanying figures. It is noted that wherever practicable similar or like reference numbers may be used in the figures and may indicate similar or like functionality.

Embodiments of the present disclosure relate to a cable with circuitry that enables the cable to communicate data in one of at least two different signal modes of operation. In a first signal mode, the cable enables data communication between the circuitry and either a source device or a sink device. The first signal mode can be used either to communicate properties of the cable itself or of a signal passing through the cable to either the source device or the sink device. In a second signal mode, the cable enables data communication between the source device and the sink device. The second signal mode can be used to communicate data in accordance with a predetermined protocol.

As used in this disclosure, the term "source device" refers to a device that provides data stream to another device (e.g., a sink device). Correspondingly, the term "sink device" described herein refers to a device that receives data stream from another device (e.g., a source device). Examples of source device and sink device include mobile phones, smart phones, Blu-ray players, gaming consoles, laptop computers, tablet computers, televisions, and display devices. In some embodiments, source device can be a portable device typically powered by a battery whereas a sink device can be a device that is typically not portable and typically powered by an alternating current (AC) source. Alternatively, source device and/or sink device can be repeater devices.

The term "transmitter" described herein refers to a device or a component of a device that transmits a signal, which can be received by a receiving device or a component of a receiving device. Correspondingly, the term "receiver" described herein refers to a device or a component of a device that receives a signal transmitted by a transmitting device or a component of a transmitting device. In some embodiments, a transmitter or a receiver can be embedded in source and sink devices. Alternatively, a transmitter and a receiver can be embedded in each of the source and sink devices.

Figure 1:
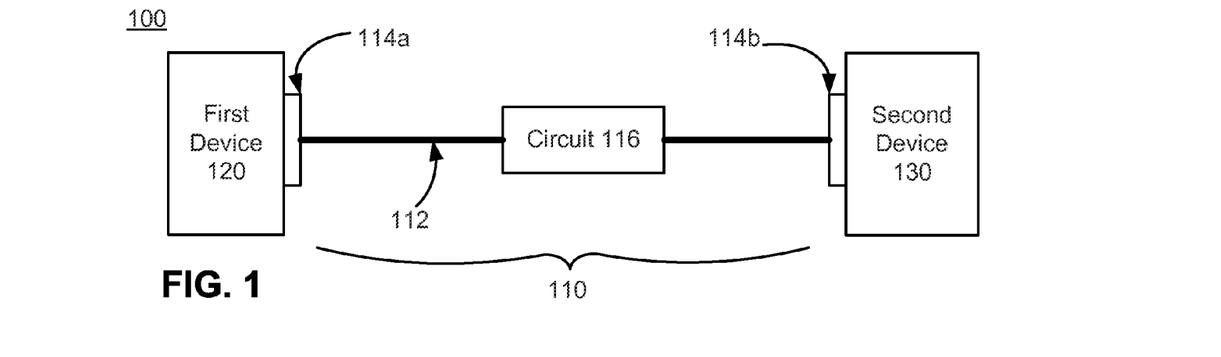
FIG. 1 is a high-level block diagram of a system for multimedia data communications, according to one embodiment.

FIG. 1 is a high-level block diagram of a system 100 for multimedia data communications, according to one embodiment. System 100 can include, among other components, first device 120, second device 130, and cable 110 between first device 120 and second device 130. First device 120 may function as a source device that can transmit multimedia data to second device 130 that may function as a sink device. Alternatively, first device 120 can function as a sink device and second device 130 can function as a source device.

Cable 110 includes circuit 116 that can configure cable 110 to communicate data between circuit 116 and either first device 120 or second device 130. One advantage of data communication between circuit 116 and either first device 120 or second device 130 is an ability to communicate properties of cable 110 itself or of a signal passing through cable 110 to either first device 120 or second device 130. For example, circuit 116 can provide impedance information of a conductor of cable 110 to either first device 120 or second device 130 for further processing. Similarly, circuit 116 can measure voltage drop across the length of cable 110 and provide that information to a sink device (e.g., second device 130), which can adjust the voltage provided to cable 110 accordingly. In other words, circuit 116 of cable 110 can provide real-time information of either a property of cable 110 itself or of a signal passing through cable 110 to one of the devices coupled to cable 110 and such information can be used to adjust the data communicated over cable 110.

First device 120 and second device 130 can include a transmitter (not shown) and/or a receiver (not shown) to variously implement communications between first device 120 and second device 130 via cable 110. Cable 110 includes connectors 114a and 114b at either ends of cable 110 to couple with first device 120 and second device 130. One or both connectors 114a and 114b include one or more contacts, such as pins, balls, pads, and/or other connection hardware, the configuration of which is compatible with a particular interface standard. For example, connector 114a (and/or 114b) can be a micro-USB, mini-USB, or standard USB connector with USB 2.0, USB 3.0, or other USB standard. Alternatively, connector 114a (and/or 114b) is compatible with one or more of: an HDMI standard such as the HDMI 1.4 standard released May 28, 2009, by HDMI Licensing, LLC of Sunnyvale, Calif.; an MHL standard such as the MHL 1.0 specification released Jun. 30, 2010, by the MHL Consortium of Sunnyvale, Calif.; a Digital Visual Interface (DVI) standard such as the DVI 1.0 standard released Apr. 2, 1999, by the Digital Display Working Group of Vancouver, Wash.; and a DisplayPort standard such as the DisplayPort 1.2 standard released Dec. 22, 2009, by the Video Electronics Standards Association of Newark, Calif.

Cable 110 includes a set of conductors (e.g., conductor set 112) coupled between connectors 114a and 114b, and circuit 116 for communicating data between first device 120 and second device 130. Conductor set 112 includes one or more conductors for variously providing power (e.g., to exchange a supply voltage and a ground voltage) and signals (e.g., data, clock and/or control signals) between first device 120 and second device 130. Circuit 116 is operable to detect the presence of a device capable of receiving or transmitting data between first device 120 and second device 130, as described below in detail with reference to FIGS. 4 through 9.

Figure 2:
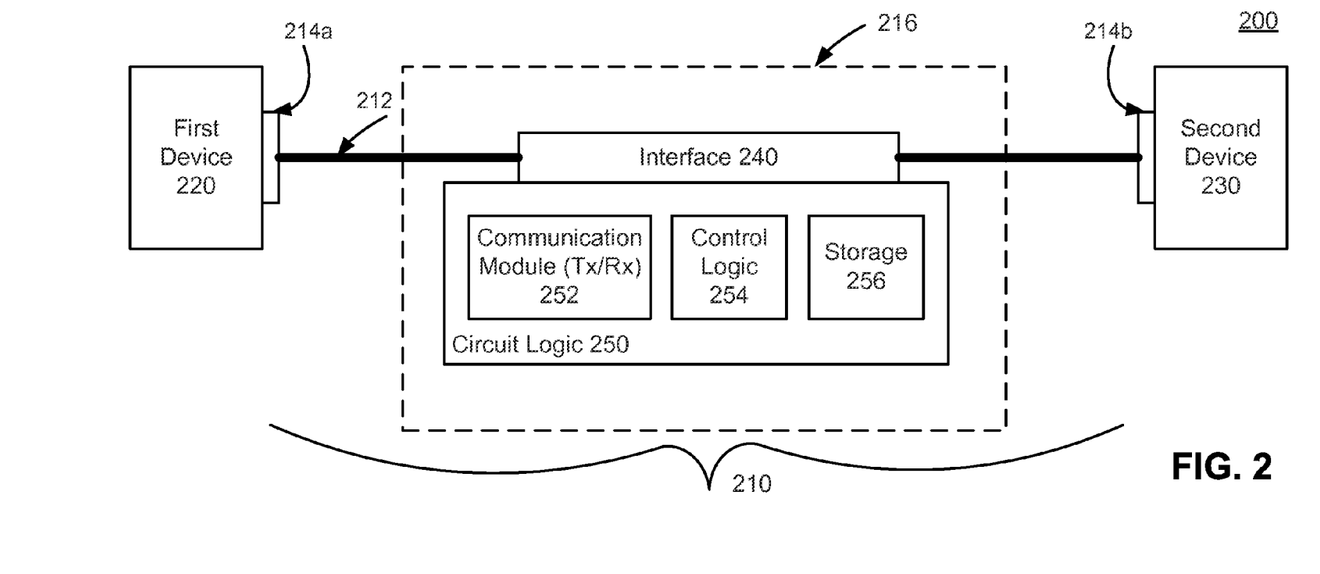
FIG. 2 is a block diagram of a cable, according to one embodiment.

FIG. 2 is a block diagram depicting some of the elements of circuit 216, which is similar to FIG. 1's circuit 116. Circuit 216 is part of cable 210 coupling first device 220 and second device 230 via connectors 214a and 214b. Cable 210 includes a set of conductors (e.g., conductor set 212) and circuit 216. Circuit 216 includes interface 240 and circuit logic 250. Interface 240 is used to exchange signals between one or more conductors of conductor set 212 and circuit logic 250. Circuit logic 250 can include, among other components, communication module 252, control logic 254, and storage 256.

Communication module 252 includes a transmit module (not shown) or a receive module (not shown). Alternatively, communication module 252 can include both a transmit module and a receive module. A transmit module transmits signals whereas receive module receives signals that are transmitted. Communication module 252 is configured by control logic 254 to either transmit data or receive data. Alternatively, control logic 254 can be configured to both transmit data and receive data. Control logic 254 can also configure conductor set 212 to operate cable 210 in a plurality of modes of operation. For example, a first signal mode of operation can be between circuit 216 and either first device 220 or second device 230. And a second signal mode of operation can be a direct communication between first device 220 and second device 230. As will be described below in detail with reference to FIGS. 4 through 9, control logic 254 can control switches (not shown) to configure cable 210 in either the first signal mode or the second signal mode of operation.

Circuit 216 can communicate relevant information to an external device (e.g., first device 220 or second device 230) to identify cable 210 to the external device as having interface hardware compatible with an interface standard. Alternatively, circuit 216 can identify a performance limitation of cable 210 and indicate such performance limitation to an external device. For example, circuit 216 can directly or indirectly indicate to first device 220 (and/or second device 230) that an operation of cable 210 is constrained by a performance threshold or a performance range (e.g., related to operable range of power, voltage, current, frequency or the like), which is different than a corresponding threshold or range specified by the interface standard.

Storage 256 is a memory to store information indicative of one or more performance characteristics of the cable. Storage 256 can be a random access memory (RAM) or other dynamic storage memory device for storing dynamic information. Alternatively, storage 256 can comprise a read only memory (ROM) or other non-volatile static storage device (e.g., flash memory, a hard disk, solid-state drive) for storing static information. In an embodiment, storage 256 can store information related to characteristics of cable 210 such as impedance, length, operable frequency range, measured degree of crosstalk between the set of conductors, electromagnetic interference, and common-mode radiation. Such cable characteristic information can be stored in storage 256 when cable 210 is manufactured. Alternatively, such cable characteristic information can be stored in storage 256 in real-time while cable 210 is being used to communicate data.

Figure 3A:
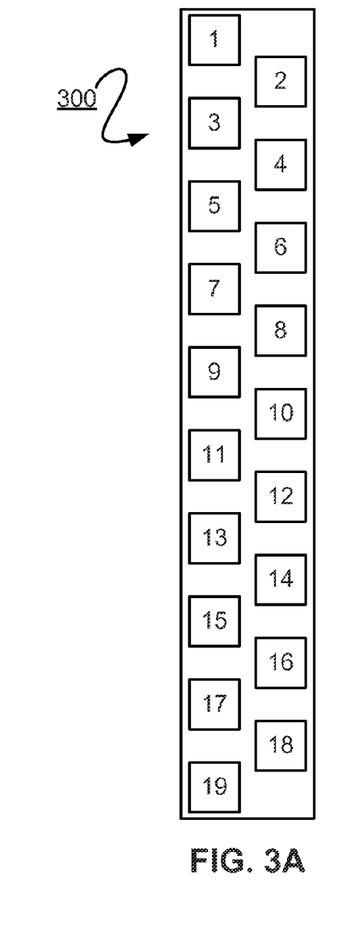
FIG. 3A is a diagram illustrating a pinout of a high definition multimedia interface connector, according to one embodiment.
Figure 3B:
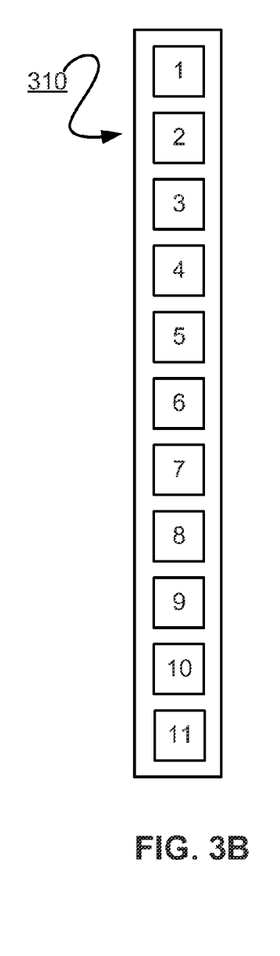
FIG. 3B is a diagram illustrating a pinout of a mobile high-definition link (MHL) connector, according to one embodiment.
Figure 3C:
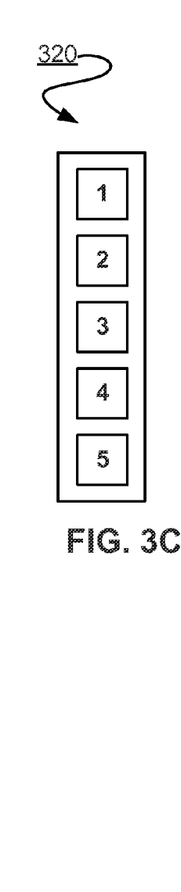
FIG. 3C is a diagram illustrating of a pinout of a 5-pin MHL connector, according to one embodiment.

FIGS. 3A through 3C are block diagrams depicting pinouts 310 and 320 of a connector in accordance with interface standards HDMI and MHL, respectively. Pinout 330 is a MHL-based 5-pin implementation. Pinout 310 of FIG. 3A depicts an HDMI connector comprising nineteen pins, including three pairs of differential data signal pins. In an exemplary embodiment, the three pairs of differential data signal pins can be mapped as follows: TMDS D0+ and TMDS D0− mapped to pins 7 and 9; TMDS D1+ and TMDS D1− mapped to pins 4 and 6; and TMDS D2+ and TMDS D2− mapped to pins 1 and 3. Pinout 310 also includes a pair of pins carrying clock signals, TMDS Clock+ and TMDS Clock−, which can be mapped to pins 10 and 12. Pinout 310 further includes a power supply pin (+5V power supply from transmitter) that can be mapped to pin 18 and a ground pin that can be mapped to pin 17. The remaining pins of pinout 310 include data shield, clock shield, and other control pins. A complete description of each HDMI connector pin and its mapping can be found in the HDMI 1.4 standard released May 28, 2009, by HDMI Licensing, LLC of Sunnyvale, Calif., which is incorporate by reference herein in its entirety.

Pinout 320 of FIG. 3B depicts an MHL connector comprising eleven pins, including two pairs of differential data signal pins. In an exemplary embodiment, the two pairs of differential data signal pins can be mapped as follows: TMDS Data+ and TMDS Data− mapped to pins 1 and 3; and USB Data+ and USB Data− mapped to pins 8 and 9. Pinout 320 also includes a pair of pins carrying clock signals, TMDS Clock+ and TMDS Clock−, which can be mapped to pins 6 and 8. Pinout 320 further includes a power supply pin (+5V power supply from receiver) that can be mapped to pin 11 and a ground pin that can be mapped to pin 11. The remaining pins of pinout 320 include TMDS data shield, TMDS clock shield, and control bus. A complete description of each MHL connector pin and its mapping can be found in the MHL standard such as the MHL 1.0 specification released Jun. 30, 2010, which is incorporate by reference herein in its entirety.

Pinout 330 of FIG. 3C depicts a 5-pin MHL connector comprising five pins, including one pair of differential data signal pins mapped as follows: TMDS+ and TMDS− mapped to pins 2 and 3. Pinout 330 also includes a power supply pin (+5V VBUS) that is be mapped to pin 1, a ground pin that is be mapped to pin 5, and a control bus pin mapped to pin 4. A complete description of each pin of the 5-pin MHL connector its mapping can be found in the MHL standard such as the MHL 1.0 specification released Jun. 30, 2010.

FIGS. 4 through 9 depict cables connected between a source device and a sink device for communicating data. While FIGS. 4-9 depict MHL connectors with five pins (e.g., TMDS+ 402, TMDS− 404, CBUS− 406, VBUS 408, and GND 410 of FIG. 4), it will be understood that the disclosure of FIGS. 4 through 9 is not limited to 5-pin MHL connectors but also extends to others connectors (e.g., HDMI or MHL) with any number of pins such as connectors including pins representing a combination of data pins, a control pin, a power supply pin, and a ground pin. For example, FIGS. 4 through 9 can include HDMI connectors with nineteen pins each or MHL connectors with eleven pins each. For each of the following embodiments depicted in FIGS. 4 through 9, the source end (or upstream end) of a cable is on the left hand side of the figure and the sink end (or downstream end) of the cable is on the right hand side of the figure. This disclosure is not limited to any particular standard and it applicable to any audio/video interface standard (e.g., HDMI or MHL) or any audio/video proprietary interfaces that enable communication of data over a cable.

Figure 4:
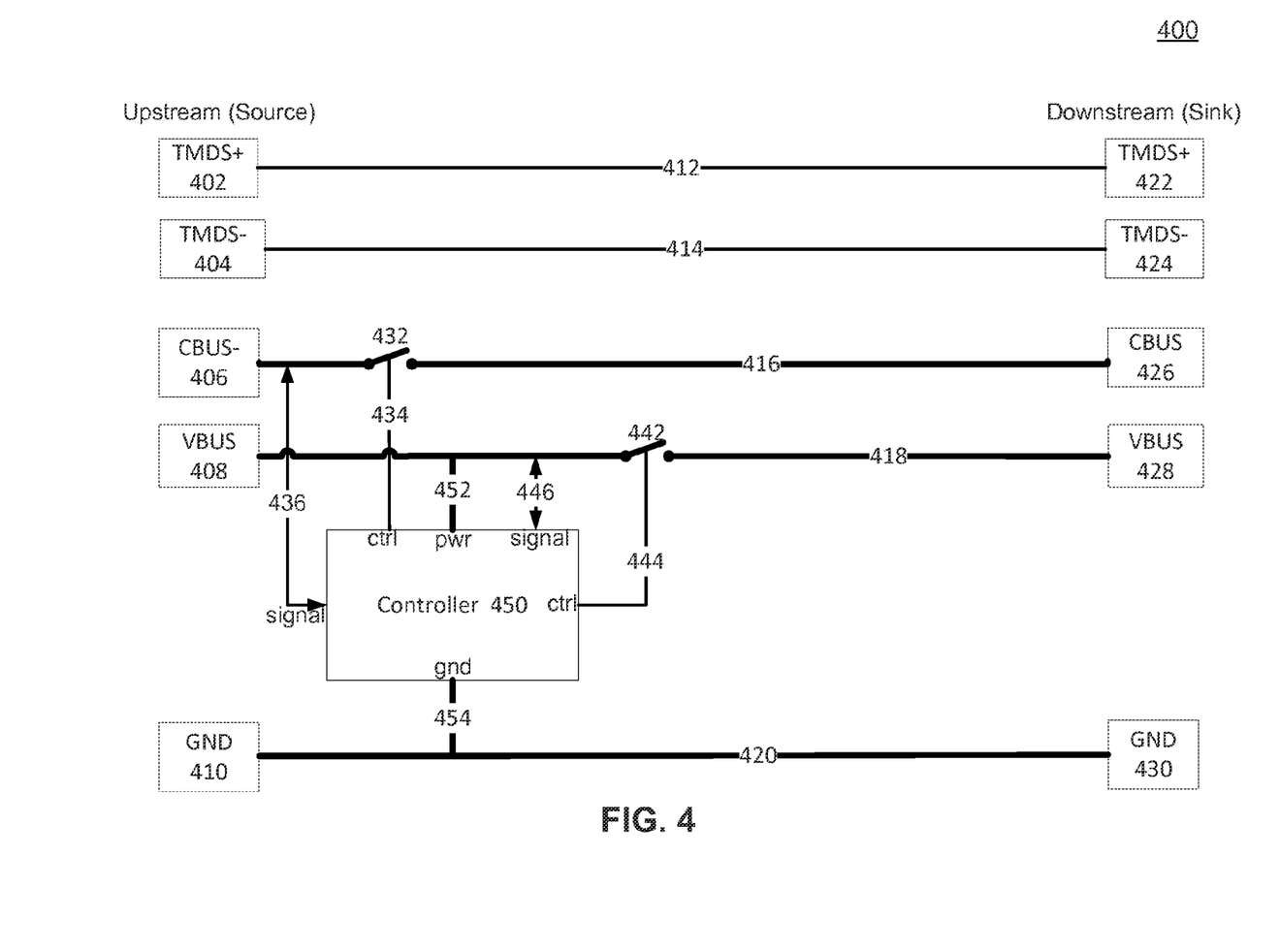
FIG. 4 is a block diagram depicting a cable comprising circuitry on the source end of the cable to configure the cable to communicate between the circuitry and a source device, according to one embodiment.

FIG. 4 is a block diagram depicting cable 400 comprising circuitry on the source end of cable 400 to configure the cable to communicate between the circuitry and a source device, according to one embodiment. The circuitry can configure cable 400 in a mode of operation where the circuitry can communicate information (transmit and/or receive) with an external device on the source end. The mode of operation is established by turning off a switch and thereby disconnecting a connection between the source end and the sink end of cable 400.

In FIG. 4, the source end of cable 400 is connected with a connector (not shown) that includes pins, TMDS+ 402, TMDS− 404, CBUS− 406, VBUS 408, and GND 410. The sink end of cable 400 is connected with a connector (not shown) that includes pins, TMDS+ 422, TMDS− 424, CBUS 426, VBUS 428, and GND 430. Cable 400 communicates data from the source end of cable 400 to the sink end of cable 400. For example, cable 400 can be connected to a mobile phone at the source end and to a high-definition television at the sink end such that a user of the mobile phone can transmit data to the television to display a video being played on the mobile phone.

Cable 400 includes a set of conductors (i.e., conductors 412, 414, 416, 418, and 420) between each pin of a connector on the source end and the sink end. Each conductor of the set of conductors is used for transmitting data from the source device to the sink device through the connectors at either end. Cable 400 also includes a circuit that comprises controller 450 and switches 432 and 442.

Switch 432 is a three-point switch between CBUS− pin 406, CBUS pin 426, and controller 450. Switch 432 can be configured to form a connection either between CBUS− pin 406 and CBUS pin 426 or between CBUS− pin 406 and controller 450 through signal 436. When switch 432 forms a connection between CBUS− pin 406 and CBUS pin 426, signal path 436 is placed in a high impedance state (e.g., by placing an additional switch (not shown) in series with signal path 436 in off state) so as to not affect the operation of controller 450 due to the external devices (i.e., source or sink devices). Similarly, when switch 432 forms a connection between CBUS− pin 406 and controller 450 through signal path 436, signal path 416 is placed in a high impedance state (e.g., by placing switch 432 in off state) so as to not affect the performance of controller 450 or the source device due to the sink device.

Switch 442, similar to switch 432, is a three-point switch between VBUS pin 408, VBUS pin 428, and controller 450. That is, switch 442 can be configured to form a connection either between VBUS pin 408 and VBUS pin 428 or between VBUS pin 408 and controller 450 through signal 446. When switch 442 forms a connection between VBUS pin 408 and VBUS pin 428, the signal path 446 is placed in a high impedance state (e.g., by placing an additional switch (not shown) in series with signal path 446 in off state) so as to not affect the performance of controller 450 due to the external devices (i.e., source or sink devices). Similarly, when switch 442 form a connection between VBUS pin 408 and controller 450, the signal path depicted by 418 is placed in a high impedance state (e.g., by placing switch 442 in off state) so as to not affect the performance of controller 450 or the source device due to the sink device.

Controller 450 controls switches 432 and 442 to place cable 400 in one of at least two signal modes of operation. In a first signal mode of operation, communication of data between controller 450 and an external device connected to cable 400 (i.e., either a source device or a sink device) is enabled. The first signal mode can be used by a source device to read characteristic data of cable 400 from a memory (e.g., storage 256) of controller 450 or write cable characteristic data to the memory. For example, cable characteristic data can include data associated with at least one of the following characteristics of the conductor set: impedance of the set of conductors, length of a cable, operable frequency range of the cable, measured degree of crosstalk between the set of conductors, electromagnetic interference, and common-mode radiation. Cable 400 is placed in the first signal mode by having controller 450 turning off either switch 432 and establishing a signal path with CBUS− pin 406 (i.e., source device), or turning off switch 442 and establishing a signal path with VBUS pin 408 (i.e., source device). Alternatively, both switches 432 and 442 can be turned off and both signal paths between CBUS− pin 406 and signal 436, and between VBUS pin 408 and signal 446 can be established.

A second signal mode of operation enables communication of data between a source device and a sink device connected to cable 400. The second signal mode can be used for communication of data in a normal protocol mode. For example, a cable can communicate data using Transition Minimized Differential Sampling (TMDS). Cable 400 is placed in the second signal mode by having controller 450 turn on switch 432 to establish a signal path between CBUS− pin 406 (i.e., source device) and CBUS pin 426 (i.e., sink device), and turn on switch 442 to establish a signal path between VBUS pin 408 (i.e., source device) and VBUS pin 448 (i.e., sink device).

In one embodiment, the first signal mode can be set as default mode of operation for cable 400. That is, when a cable is shipped from the factory, controller 450 is configured to operate cable 400 in the first signal mode. In this way, cable 400 is able to, for example, measure a signal property and communicate to an external device (i.e., source or sink device) by default. Alternatively, the second signal mode can be set as the default mode of operation.

Controller 450 is powered by a power supply signal and a ground signal carried by conductors 418 and 420, which are represented by power signal 452 and ground signal 454, respectively. Power and ground signals for controller 450 are connected to the source end of cable 400 such that even when switches 432 and 442 are turned off (and consequently power and ground signals are cutoff from the sink device), controller 450 can still receive power from the source device.

Figure 5:
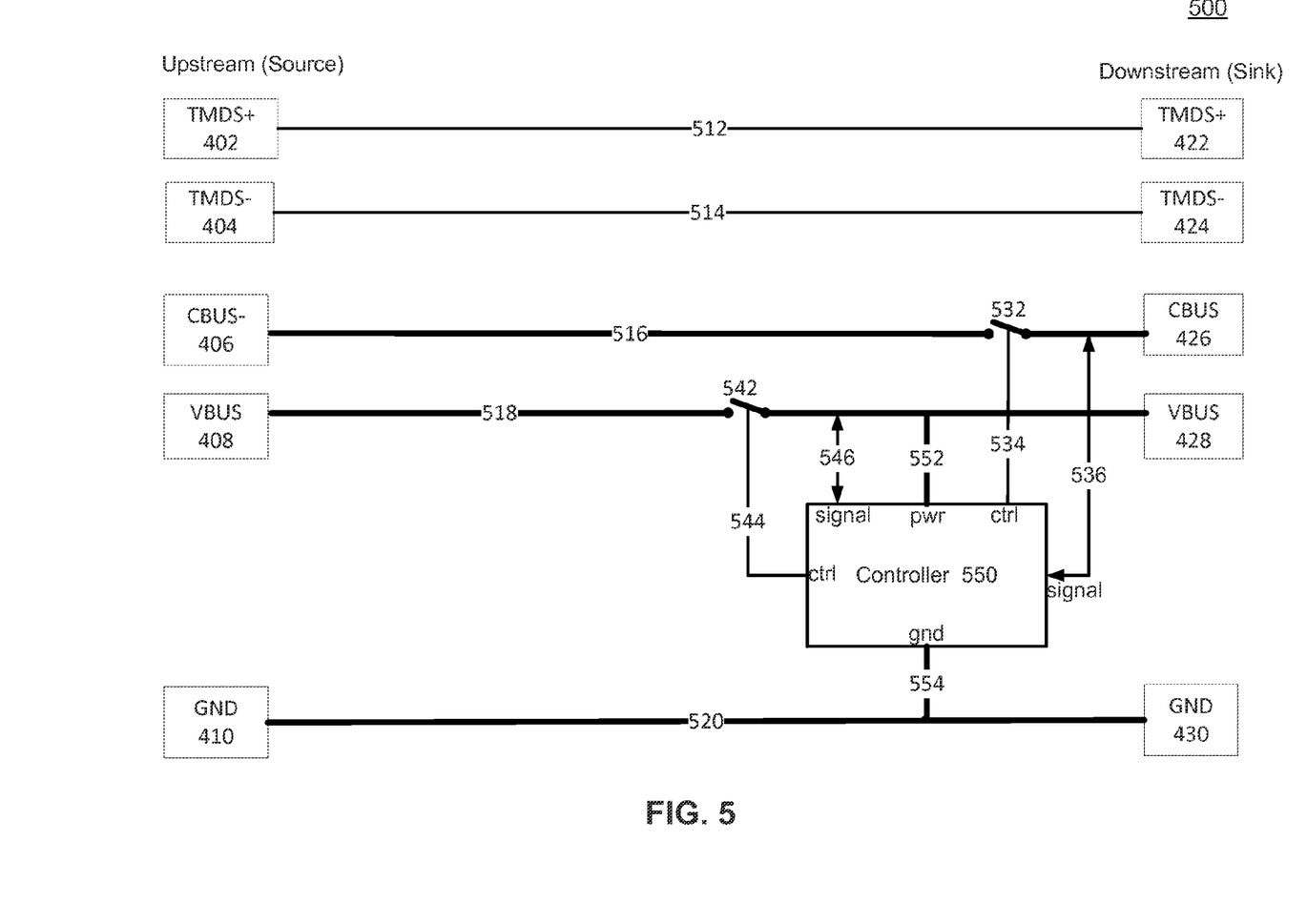
FIG. 5 is a block diagram depicting a cable comprising circuitry on the sink end of the cable to configure the cable to communicate between the circuitry and a sink device, according to one embodiment.

FIG. 5 is a block diagram depicting cable 500 comprising circuitry on the sink end of cable 500 to configure the cable to communicate between the circuitry and a sink device, according to one embodiment. The circuitry can configure cable 500 in a mode of operation where the circuitry can communicate information (transmit and/or receive) with an external device on the sink end. The mode of operation is established by turning off a switch (e.g., switch 532) and thereby disconnecting a connection between the source end and the sink end of cable 500.

In FIG. 5, the source end of cable 500 is connected with a connector (not shown) that includes pins, TMDS+ 402, TMDS− 404, CBUS− 406, VBUS 408, and GND 410. The sink end of cable 500 is connected with a connector (not shown) that includes pins, TMDS+ 422, TMDS− 424, CBUS 426, VBUS 428, and GND 430. The pins on the source end and the sink end of cable 500 are the same as the pins of cable 400 described above with reference to FIG. 4.

Cable 500 includes a set of conductors (i.e., conductors 512, 514, 516, 518, and 520) between each pin of a connector on the source end and the sink end. Each conductor of the set of conductors is used for transmitting data from the source device to the sink device through the connectors at either end. Cable 500 also includes a circuit that comprises controller 550, and switches 532 and 542. Cable 500 is similar to cable 400 described above except that controller 450 is placed on the source end of cable 400 whereas controller 550 is placed at the sink end of cable 500.

Controller 550 is powered by a power supply signal and a ground signal carried by conductors 518 and 520, and are represented by power signal 552 and ground signal 554, respectively. Power and ground signals for controller 550 are connected to the sink end of cable 500 such that even when switches 532 and 542 are turned off (and consequently power and ground signals are cutoff from the source device), controller 550 can still receive power from the sink device. The functionality of controller 550 and its controlling of switches 532 and 542 is similar to controller 450 and its controlling of switches 432 and 442 described above with reference to FIG. 4. The functionality and operation of signal path 536 is similar to that of signal path 436 described above with reference to FIG. 4 except that signal path 436 connects to the source end of the cable whereas signal path 536 connects to the sink end (thereby can be controlled by the sink device) of the cable. In an exemplary embodiment when a user of a smart phone wants to stream a video playing on his smart phone on to a high-definition television through cable 500, the smart phone is the source device and the television is the sink device. In addition to displaying a video stream from the smart phone on the television (e.g., using conductors 512 and 514), the smart phone's battery can also be charged using the power supply from the television (e.g., using conductor 518).

Figure 6:
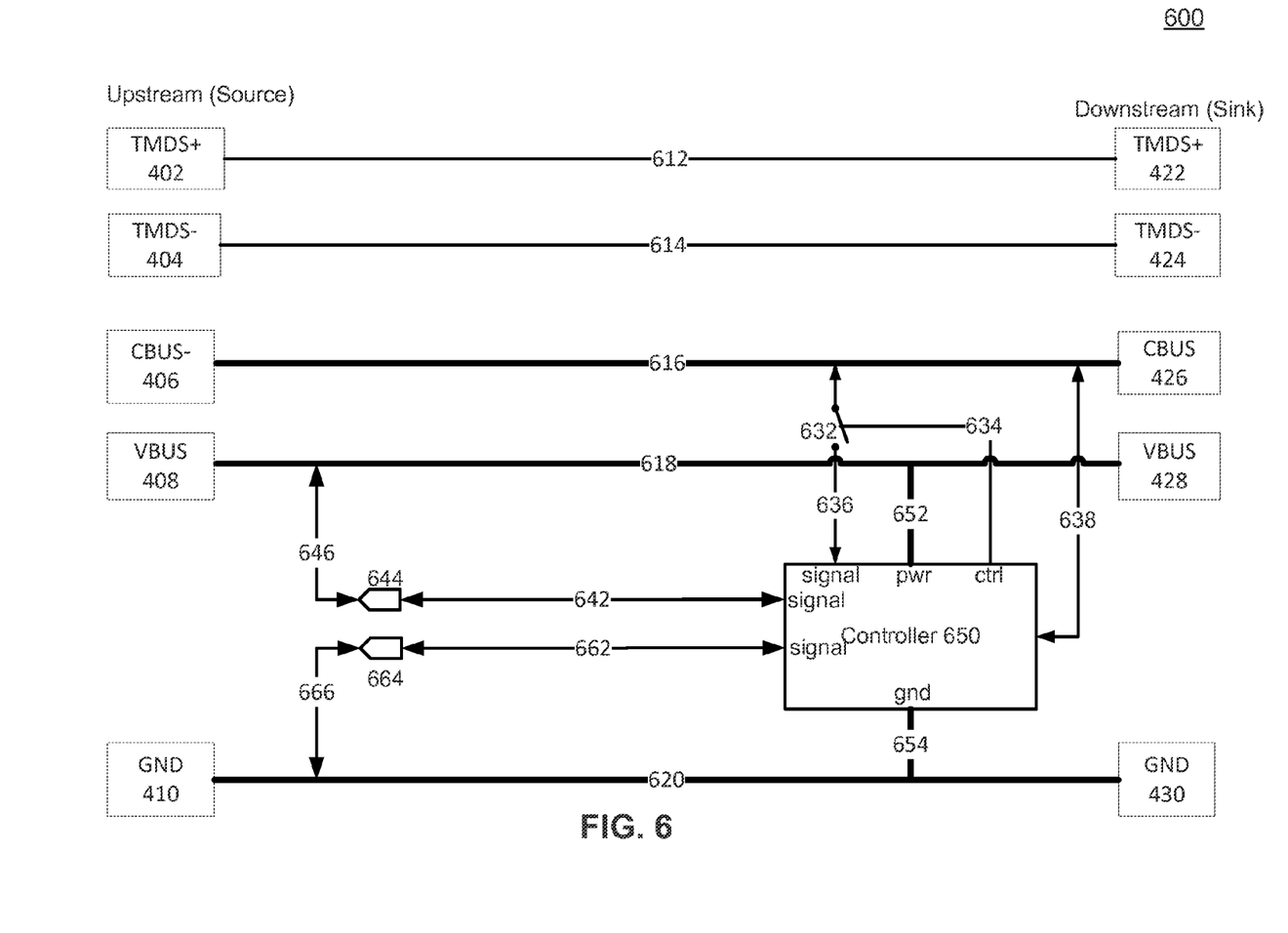
FIG. 6 is a block diagram depicting a cable comprising circuitry configured to couple to a conductor of the cable, according to one embodiment.

FIG. 6 is a block diagram depicting cable 600 (e.g., a cable) comprising circuitry coupling to a conductor of cable 600, according to one embodiment. The circuitry can configure cable 600 in a mode of operation where the circuitry can measure a property of cable 600 and communicate the measured information with an external device on either the source end or the sink end. The mode of operation is established by turning on a switch to form a coupling between the circuitry and the conductor without disconnecting a connection between the source end and the sink end of cable 600.

In FIG. 6, the source end of cable 600 is connected with a connector (not shown) that includes pins, TMDS+ 402, TMDS– 404, CBUS– 406, VBUS 408, and GND 410. The sink end of cable 600 is connected with a connector (not shown) that includes pins, TMDS+ 422, TMDS– 424, CBUS 426, VBUS 428, and GND 430. The pins on the source end and the sink end of cable 600 are the same as the pins of cable 400 described above with reference to FIG. 4. Cable 600 includes a set of conductors (i.e., conductors 612, 614, 616, 618, and 620) between each pin of a connector on the source end and the sink end. Each conductor of the set of conductors is used for transmitting data from the source device to the sink device through the connectors at either end. Cable 600 also includes a circuit that comprises controller 650, switch 632, and signal paths between controller 650 and one or more of conductors of the set of conductors.

Switch 632 is connected between conductor 616 (connecting CBUS– pin 406 on source end and CBUS pin 426 on sink end) and controller 650. By turning on switch 632, a connection between conductor 616 and controller 450 through signal path 636 is established. Controller 650 controls switch 632 using control signal 634. When controller 650 turns off switch 632, signal path 636 is placed in a high impedance state so as to not affect the performance of controller 650 due to the external devices (i.e., source or sink devices). On the other hand, when controller 650 turns on switch 632, controller 650 can communicate with either the source device (e.g., via conductor 616 and CBUS– pin 406) or sink device (e.g., via conductor 616 and CBUS pin 426). Controller 650 turns on switch 632 in a signal mode where the source and sink devices are not communicating data between themselves (e.g., first signal mode). Because conductor 616 is not being used by the source and sink devices in the signal mode where the source and sink devices are not communicating data between themselves, controller 650 can communicate with either of the source or sink devices. FIG. 6 further depicts signal path 638 connected between CBUS pin 426 and controller 650 such that controller 650 can be controlled by a sink device even when switch 632 is turned off. In some embodiments, cable 600 does not include signal path 638 and controller 650 can be controlled by a sink device through signal path 636 when switch 632 is turned on.

FIG. 6 also depicts two sets of signal paths between conductors and controller 650. A first set of signal paths 642, 644, and 646 connect controller 650 and conductor 618. A second set of signal paths 662, 664, and 666 connect controller 650 and conductor 620. The first and second set of signal paths can be used to measure a property of a signal passing through conductors 618 and 620. For example, the first and second signal paths can measure a voltage level between conductors 618 and 620 at various points along the length of conductors 618 and 620. Alternatively, the first and second signal paths can measure an impedance level of conductors 618 and 620 at various points along the length of conductors 618 and 620. Circuit blocks 644 and 664 represent can also be used for performing measurements. In FIG. 6, the circuitry that measures signal properties or cable properties is comprised within controller 650. Alternatively, the measurement circuitry can be a separate and distinct from controller 650 as depicted and described in FIG. 7 below. It is understood that the depicted first and second signal paths are merely exemplary and that other signal paths can be used with other conductors of cable 600 to be able to measure either properties of cable 600 itself or properties of signals passing through cable 600. For example, a non-exhaustive list of signal properties that can be measured include voltage level, current level, power of the signal, frequency components of the signal, attenuation components of the signal, and a degree of skewing of the signal. Similarly, a non-exhaustive exemplary list of cable properties (e.g., properties of conductors of cable 600) that can be measured include impedance, length, operable frequency range, measured degree of crosstalk between set of conductors, electromagnetic interference, and common-mode radiation.

Figure 7:
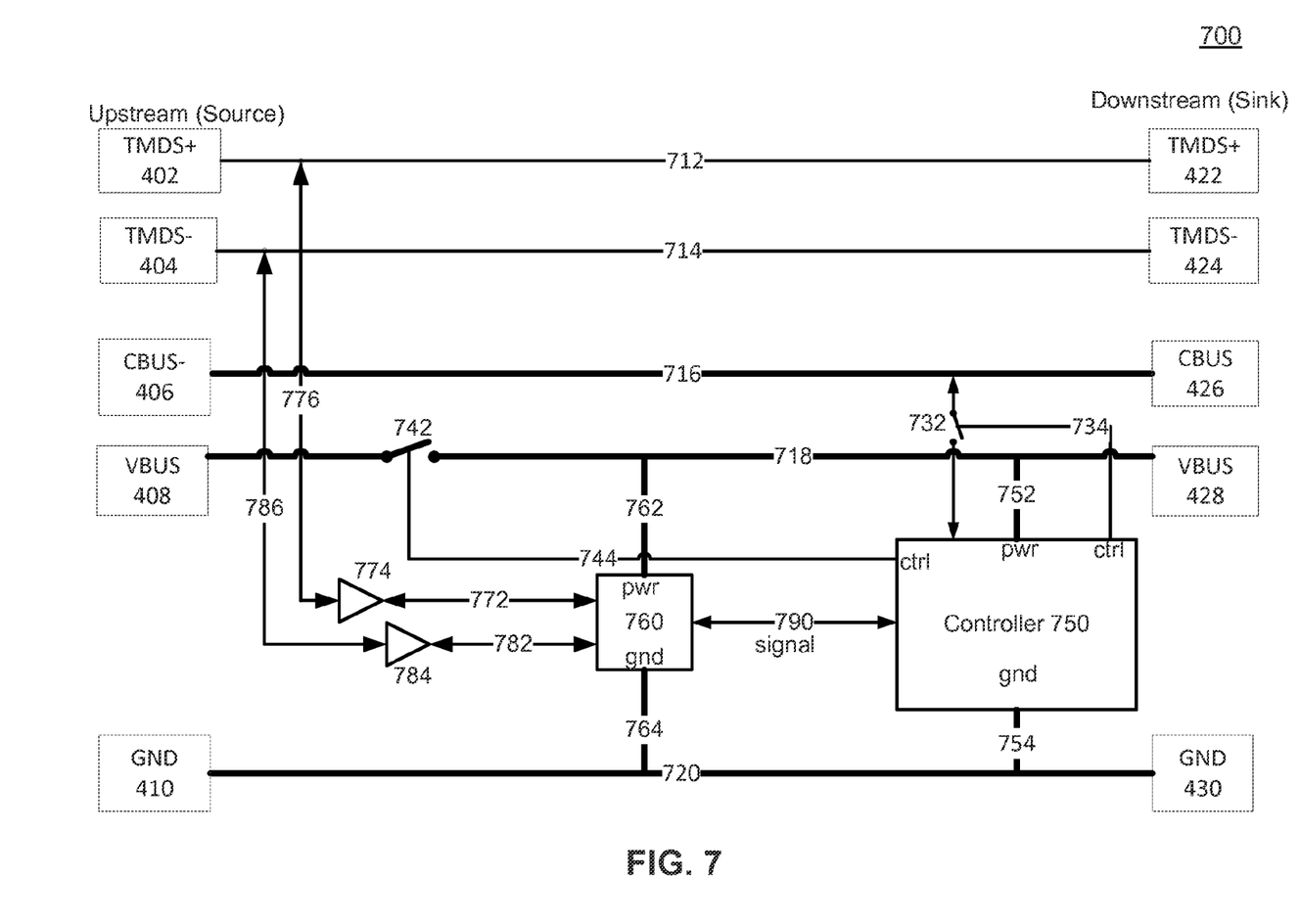
FIG. 7 is a block diagram depicting a cable comprising circuitry configured to measure a property of a signal passing through the cable, according to one embodiment.

FIG. 7 is a block diagram depicting cable 700 (e.g., a cable) comprising circuitry configured to measure a property of a signal passing through cable 700, according to one embodiment. The circuitry can configure cable 700 in a mode of operation where the circuitry can measure a property of signal passing through cable 700 and communicate the measured information with an external device on either the source end or the sink end. The mode of operation is established by turning on/off switches to form a coupling between the circuitry and the conductor similar to the circuitry of FIG. 6 described above. FIG. 7 comprises a measurement circuit (e.g., circuit 760 and its associated signal paths, 772, 774, 776, 782, 784, and 786) that is placed closer to the source end of the cable to be able to measure properties of signals closer to the source end of the cable and communicate to a sink device through a controller (e.g., controller 750).

In FIG. 7, the source end of cable 700 is connected with a connector (not shown) that includes pins, TMDS+ 402, TMDS– 404, CBUS– 406, VBUS 408, and GND 410. The sink end of cable 700 is connected with a connector (not shown) that includes pins, TMDS+ 422, TMDS− 424, CBUS 426, VBUS 428, and GND 430. The pins on the source end and the sink end of cable 600 are the same as the pins of cable 400 described above with reference to FIG. 4. Cable 700 includes a set of conductors (i.e., conductors 712, 714, 716, 718, and 720) between each pin of a connector on the source end and the sink end. Each conductor of the set of conductors is used for transmitting data from the source device to the sink device through the connectors at either end. Cable 700 also includes a circuit that comprises controller 750, switches 732 and 742, and signal paths between controller 750 and one or more of conductors of the set of conductors. Controller 750 is placed closer to the sink end of the cable. For example, controller 750 can be physically placed within a connector on the sink end of the cable. Alternatively, controller 750 can be located within a portion of the cable that includes the conductors but still be located physically closer to the sink end of the cable.

Switch 732 is connected between conductor 716 (connecting CBUS− pin 406 on source end and CBUS pin 426 on sink end) and controller 750. Switch 732 operates in the same way as switch 632 described above in FIG. 6. FIG. 7 also depicts a set of signal paths between controller 750 and conductors 712 and 714. The set of signal paths comprises signal path 790 between controller 750 and circuit 760. Circuit 760 is used for performing measurement of signal properties and can be a separate circuit from controller 750. The set of signal paths also comprises a second set of signal paths and a third set of signal paths. The second set of signal paths 772, 774, and 776 connect circuit 760 and conductor 712. The third set of signal paths 782, 784, and 786 connect circuit 760 and conductor 714. The set of signal paths can be used to measure a property of a signal passing through conductors 712 and 714. For example, the second and third sets of signal paths can measure a skew level of a signal passing through conductors 712 and 714 at various points along the length of conductors 712 and 714. Circuit 760 receives measurement data from the second and third sets of signal paths and processes the received data further before communicating the processed data to controller 750. Circuit 760 is placed closer to the source end of the cable. For example, circuit 760 can be physically placed within a connector on the source end of the cable. Alternatively, circuit 760 can be located within a portion of the cable that includes the conductors but still be located physically closer to the source end of the cable.

Circuit 760 is powered by conductor 718 (power supply voltage via signal 762) and conductor 720 (ground signal via signal 764). Controller 750 controls switch 742 to supply voltage to circuit 760 in a first signal mode, where there is no data communication between the source and sink devices. When controller 750 turns offs switch 742 using control signal 744 in the first signal mode, circuit 760 receives supply voltage from the sink device through VBUS 428 pin via conductor 718. Circuit 760 receives the ground signal from conductor 720 that is the same ground signal in both signal modes of cable 700. Signals 762 and 764 can include switches in series (not shown) that can provide isolation (i.e., to reduce loading) between circuit 760 and external devices (i.e., source and sink devices) when circuit 760 is not measuring signal properties. Circuit blocks 774 and 784 are also used for performing measurements.

Figure 8:
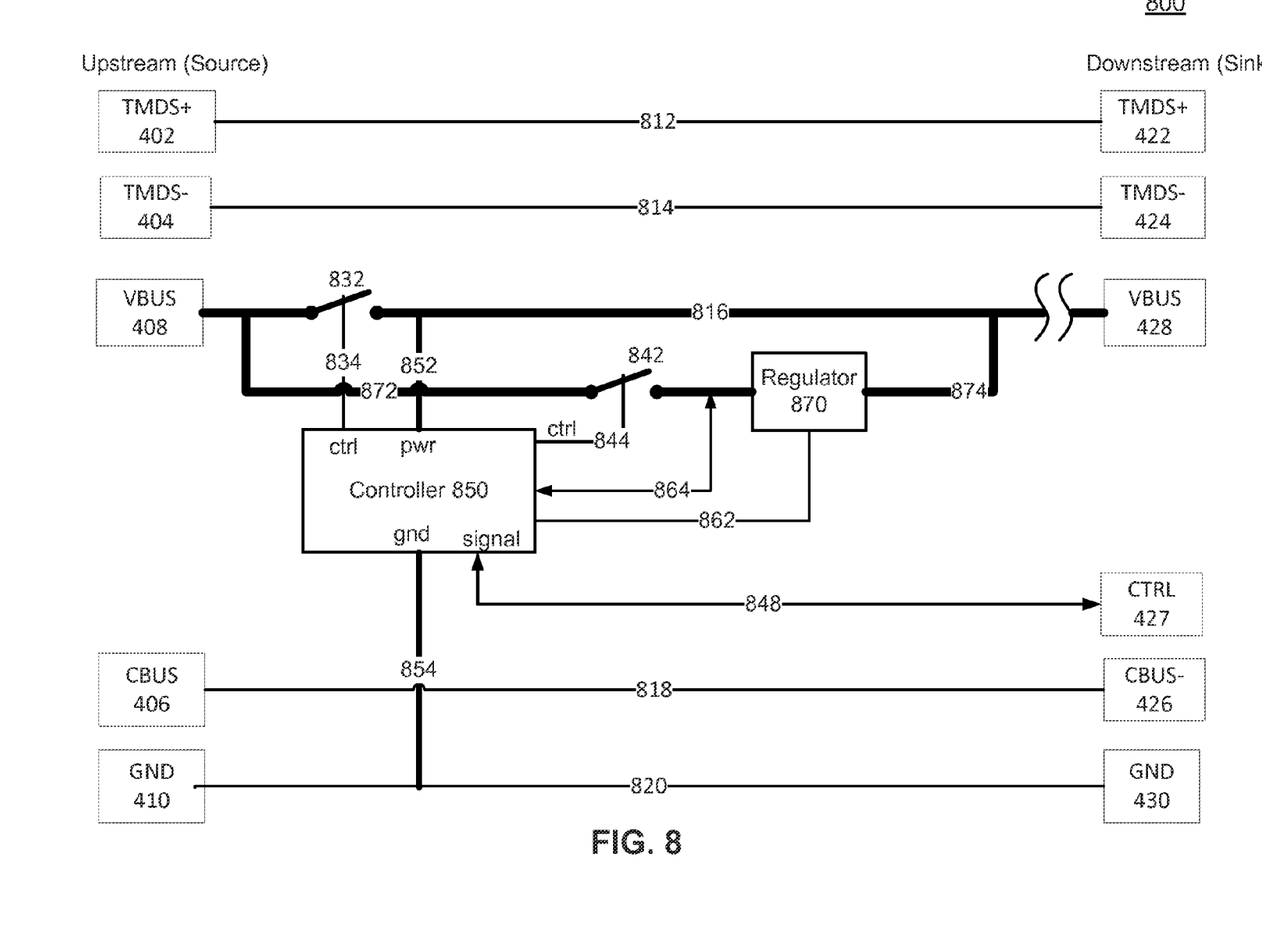
FIG. 8 is a block diagram depicting a cable comprising circuitry comprising a voltage regulator, according to one embodiment.

FIG. 8 is a block diagram depicting cable 800 comprising circuitry further comprising a voltage regulator to change supply voltage levels, according to one embodiment. The circuitry can configure cable 800 in a mode of operation where the voltage regulator can change the supply voltage levels between the sink device and the source device of cable 800, and thereby providing a compatible voltage level to both the source device and the sink device.

In FIG. 8, the source end of cable 800 is connected with a connector (not shown) that includes pins, TMDS+ 402, TMDS− 404, VBUS 408, CBUS 406, and GND 410. The sink end of cable 800 is connected with a connector (not shown) that includes pins, TMDS+ 422, TMDS− 424, VBUS 828, CTRL 427, CBUS− 426, and GND 430. The pins on the source end and the sink end of cable 800 are the same as the pins of cable 400 described above with reference to FIG. 4. CTRL pin 427 is an additional pin on the sink side that can be used for communication between controller 850 and sink device. Cable 800 includes a set of conductors (i.e., conductors 812, 814, 816, 818, and 820) between each pin of a connector on the source end and the sink end. Each conductor of the set of conductors is used for transmitting data from the source device to the sink device through the connectors at either end. Cable 800 also includes a circuit that comprises controller 850, switches 832 and 842, and regulator 870.

Regulator 870 is a voltage regulator that can convert voltage level from a first value to a second value. For example, regulator 870 can convert 12V to 5V or from 5V to 12V. Regulator 870 is connected to VBUS pin 428 on the sink end through signal path 874, and is connected to VBUS pin 408 on the source end through signal path 872 and switch 842. Switch 832 is in series with conductor 816 between VBUS pin 408 and VBUS pin 428. Controller 850 controls switches 832 and 842 to force voltage signal passing through conductor between pins VBUS 408 and VBUS 428 (e.g., conductor 816) to pass through regulator 870. For example, when controller 850 turns off switch 832 through control signal 834 and turns on switch 842 through control signal 844, voltage signal from the source end to the sink end (or vice versa) has to pass through regulator 870. In an exemplary embodiment where the sink device is providing 12V on VBUS 428 and when the source device is designed to operate at 5V at VBUS 408, the voltage signal of 12V is passed through regulator 870 to convert to 5V.

Cable 800 also comprises an optional signal path 848 between controller 850 and CTRL pin 427 on the sink end of cable 800. Controller 850 can communicate with the sink device via signal path 848. For example, controller 850 can indicate to the sink device the mode of operation of regulator 870 or even a voltage level at the output of regulator 870 to the sink device. Controller 850 can be controlled by a sink device through CTRL pin 427 similar to controller 550, which can be controlled by sink device through signal path 536 as described above with reference to FIG. 5. In some embodiments, power supply can be provided to controller 850 and to the source device through VBUS 428 pin. Controller 850 can then measure a voltage level at the source end of the cable (e.g., at VBUS pin 406) and communicate the voltage level to the sink device via signal path 848 and CTRL pin 427. Accordingly, controller 850 can communicate voltage level (or other cable properties and signal properties) to the sink device via CTRL pin 427 even before conductor 818 forms a connection between CBUS pin 406 and CBUS− pin 426 through a series switch (not shown).

Controller 850 can monitor the input/output voltage of regulator 870 by using a voltage signal (e.g., signal 864) that can sense a voltage at regulator 870. Controller 850 generates a control signal 862 that can control the settings of regulator 870, for example, to set an output voltage of regulator 870. FIG. 8 depicts that regulator 870 is placed closer to the source end of cable 800 as signified by the broken line symbol on conductor 816. Alternatively, regulator 870 can be placed closer to the sink end of cable 800. Controller 850 is powered by a supply voltage signal and a ground signal passing through conductors 816 and 820, and represented by power signal 852 and ground signal 854, respectively. Supply voltage signal for controller 850 is connected to the sink end of cable 800 such that even when switch 832 is turned off, controller 850 can still receive supply voltage from the sink device. Alternatively, controller 850 can receive supply voltage from the source end of cable 800 by changing the position of switch 832.

Figure 9:
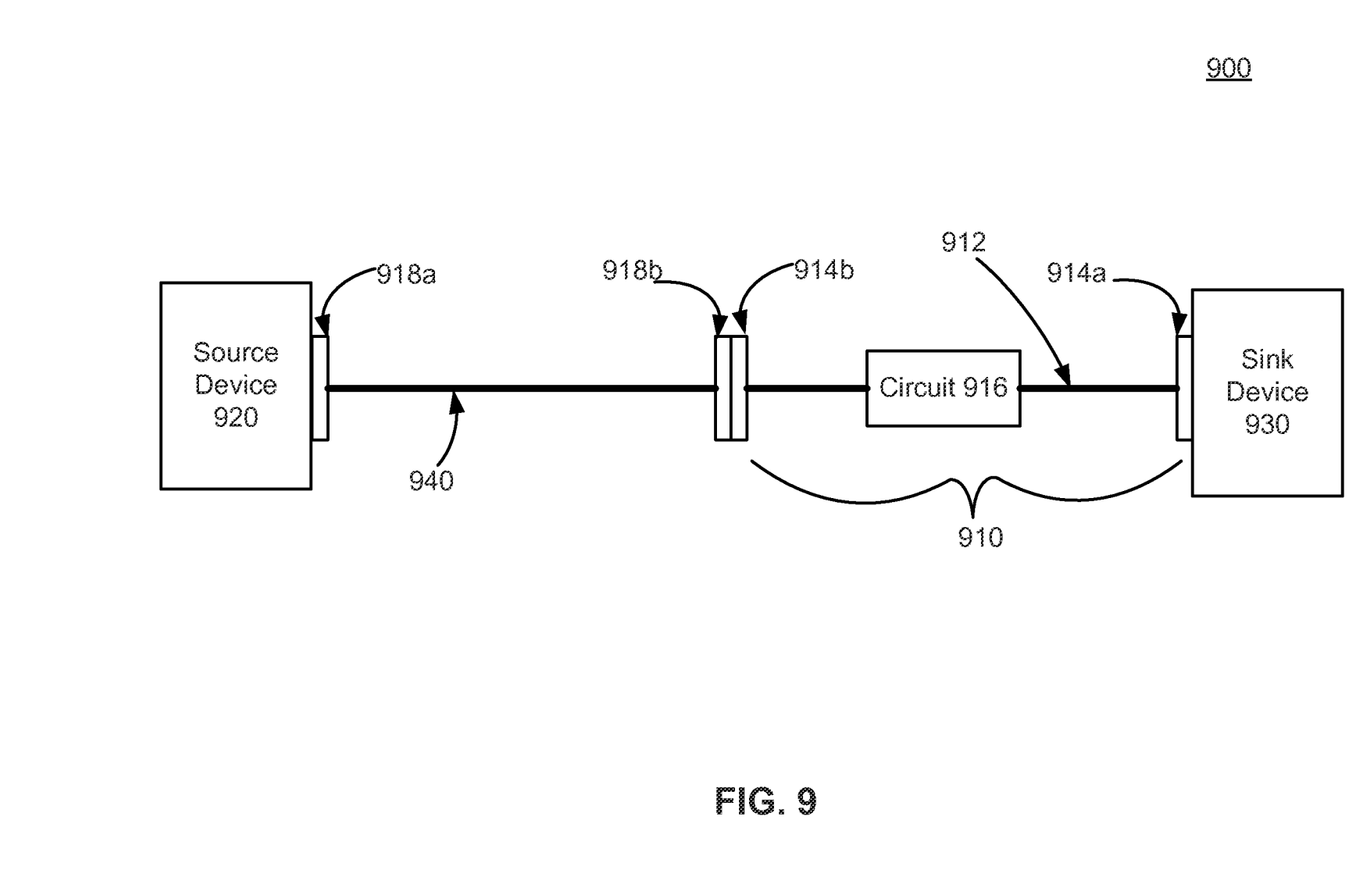
FIG. 9 is a block diagram depicting a system for connecting a source device with a sink device using two cables, according to one embodiment.

FIG. 9 is a block diagram depicting a system 900 for connecting a source device 920 and a sink device 930 using two cables 910, 940, according to one embodiment. In an embodiment where more than one cable is needed (e.g., due to a length requirement between source device 920 and sink device 930), cable 910 can be connected between source device 920 and sink device 930 through a second cable, cable 940. When the second cable does not include internal circuitry (e.g., circuit 216 of FIG. 2), cable 910 can, in addition to communicating its own properties, communicate the properties of the second cable to source device 920 and/or sink device 930.

System 900 comprises source device 920, sink device 930, cable 940, and cable 910. Cable 940 comprises connectors 918a and 918b, and cable 910 comprises connectors 914a and 914b. Cables 940 and 910 are connected back-to-back in a daisy-chained configuration. Cable 910 further comprises circuit 916 similar to circuit 216 described above with reference to FIG. 2. That is, circuit 916 can configure cable 910 to communicate data between circuit 916 and either sink device 930 or source device (via interconnect cable 916).

Cable 940 does not include an internal circuit. Cable 910 with its internal circuitry (circuit 916) can not only measure properties of itself but also can measure properties of cable 940. For example, cable 910 can send an electrical signal to cable 940 to determine the length of cable 940, and in turn communicate the measured data to one of the external devices (source device 920 or sink device 930) to adjust transmitted signal levels. Similarly, cable 910 can measure properties of signals passing through cable 940, store the measured data in circuit 916, and also communicate the measured data to one of the external devices (source device 920 or sink device 930). In some embodiments, cable 940 can also include internal circuitry similar to circuit 916.

Figure 10:
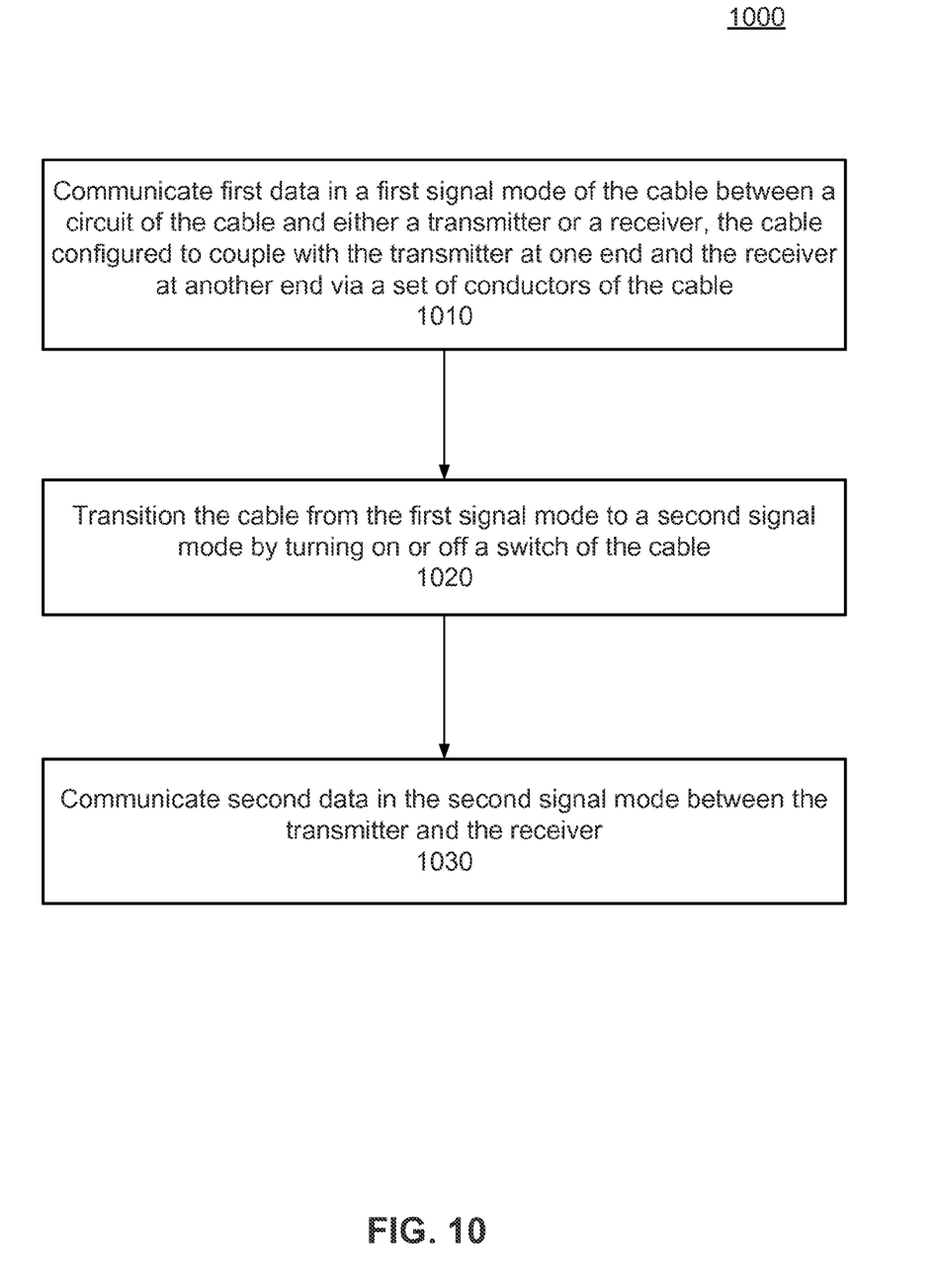
FIG. 10 is a flowchart depicting a method for communicating data between a source device and a sink device over a cable, according to one embodiment.

FIG. 10 is a flowchart depicting a method for communicating data between a source device (e.g., first device 220) and a sink device (e.g., second device 230) over a cable (e.g., cable 210), according to one embodiment. The cable, as discussed in FIGS. 4 through 8, can operate in one of at least two different signal modes of operation to communicate data. In a first signal mode, the cable enables data communication between its internal circuitry (e.g., circuit 216) and either the source device or the sink device. The first signal mode can be used either to communicate properties of the cable itself or of a signal passing through the cable to either the source device or the sink device. In a second signal mode, the cable enables data communication between the source device and the sink device. The second signal mode can be used to communicate data in accordance with a predetermined protocol (e.g., HDMI and MHL). In an embodiment, the first signal mode is the cable's default mode of operation. Alternatively, the second signal mode is the cable's default mode of operation.

First, the cable communicates 1010 first data in the first signal mode between the circuit of the cable and either a transmitter (e.g., embedded in the source device) or a receiver (e.g., embedded in the sink device). The cable is configured to couple with the transmitter at one end and the receiver at another end via a set of conductors (e.g., conductors 212) of the cable. The first signal mode is performed when there is no data communication between the source and sink devices in the predetermined protocol. The first data can comprise data related to a measurement of either properties of the cable itself or properties of signals passing through the cable. For example, a non-exhaustive list of signal properties that can be measured include voltage level, current level, power of the signal, frequency components of the signal, attenuation components of the signal, and a degree of skewing of the signal. Similarly, a non-exhaustive exemplary list of cable properties (e.g., properties of conductors) that can be measured include impedance, length, operable frequency range, measured degree of crosstalk between set of conductors, electromagnetic interference, and common-mode radiation.

The cable is then transitioned 1020 from the first signal mode to the second signal mode. The cable can be transitioned, for example, by turning on or off a switch (e.g., switch 432) coupled to one of the conductors of the cable. As described in FIGS. 4 through 8, the cable's internal circuit controls the switch to either turn it on or off. In some embodiments, the cable is transitioned from the first signal mode to the second signal mode after the circuit receives an indication from an external device (one of the source or sink devices) that the source and sink devices need to communicate in accordance with the predetermined protocol. Alternatively, the cable transition can occur at a predetermined time interval. After the cable is transitioned into the second signal mode, the cable, in step 1030, communicates second data between the source and sink devices. In some embodiments where the second signal mode is the cable's default mode of operation, the cable is transitioned from the second signal mode to the first signal mode.

The cable communicates 1030 first data in the first signal mode between the circuit of the cable and either the transmitter or the receiver. The cable can also continuously transition back-and-forth between the default first signal mode and the second signal mode. For example, the cable can operate in a default first signal mode, then transition to the second signal mode, and later transition back to the first signal mode, and so on. In one embodiment, data may be communicated 1010 from the controller to a first external device (e.g., source device) in the default first signal mode and the data may be communicated 1030 from the source device to a sink device after the cable is transitioned 1020 from the first signal mode to the second signal mode. The method depicted in FIG. 10 is merely exemplary.

Figure 11:
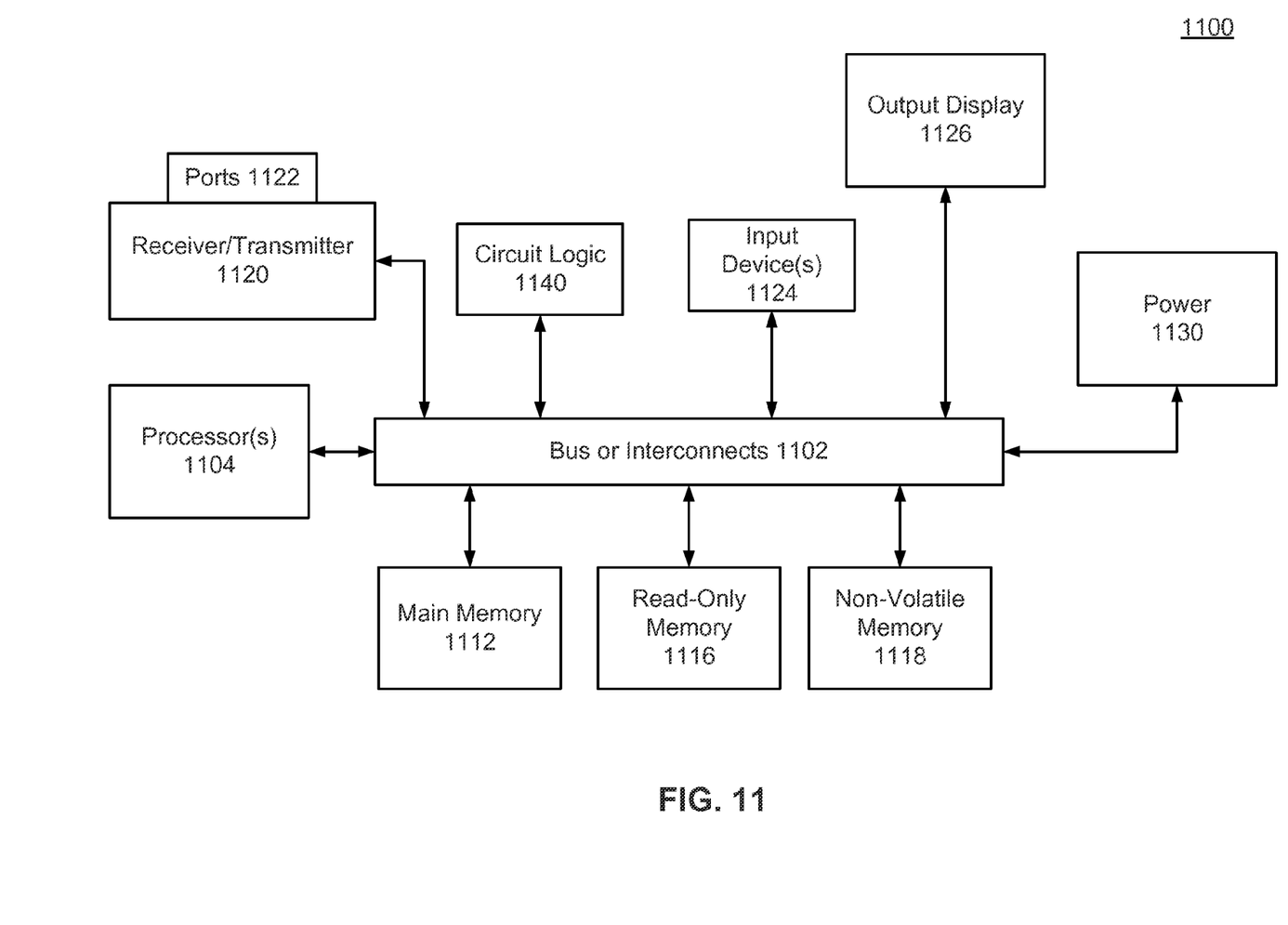
FIG. 11 is a block diagram of a source device or a sink device that communicates data over a cable, according to one embodiment.

FIG. 11 is a block diagram of either a source device or a sink device that communicates data over a cable, according to one embodiment. In some embodiments, device 1100 comprises an interconnect or bus 1102 (or other communication means) for transmission of data. Device 1100 can include a processing means such as one or more processors 1104 coupled with bus 1102 for processing information. Processors 1104 can comprise one or more physical processors and/or one or more logical processors. While bus 1102 is illustrated as a single interconnect for simplicity, it is understood that bus 1102 can represent multiple different interconnects or buses. Bus 1102 shown in FIG. 11 is an abstraction that represents any one or more separate physical buses, point to point connections, or both connected by appropriate bridges, adapters, controllers and/or the like.

In some embodiments, device 1100 further comprises a random access memory (RAM) or other dynamic storage device depicted as main memory 1112 for storing information and instructions to be executed by processors 1104. Main memory 1112 can include an active storage of applications including a browser application for using in network browsing activities by a user of device 1100. Main memory 1112 can further include certain registers or other special purpose memory.

Device 1100 can also comprise a read only memory (ROM) 1116 or other static storage device for storing static information and instructions for processors 1104. Device 1100 can further include one or more non-volatile memory elements 1118 for the storage of certain elements, including, for example, flash memory, a hard disk, solid-state drive. Device 1100 can comprise transceiver module 1120 that is coupled to bus 1102. Transceiver module 1120 can further comprise a transmitter module and a receiver module. Transceiver module 1120 comprises one or more ports 1122 to connect to other devices (not shown). For example, device 1100 can function as a source device and connect to another device that can function as a sink device.

Device 1100 can also comprise circuit logic 1140 coupled to bus 1102 and configured to detect information from a second device (not shown) coupled through ports 1122. The information detected by circuit logic 1140 can include a performance limitation of the second device. Based on the detected information, circuit logic 1140 can configure device 1100 to compensate for the detected performance limitation of the second device and communicate the same to the second device.

Device 1100 can also comprise output display 1126 and coupled via bus 1102. In some embodiments, display 1126 can include a liquid crystal display (LCD) or any other display technology, for displaying information or content to a user, including three-dimensional (3D) displays. Alternatively, display 1126 can include a touch screen that can also be part of input device 1124. In some environments, display 1126 can include an audio device, such as a speaker for providing audio information. Device 1100 can also comprise power device 1130 that can comprise a power supply, a battery, a solar cell, a fuel cell, or other device for providing or generating power. Any power provided by power device 1130 can be distributed as required to elements of device 1100.

While particular embodiments and applications of the present disclosure have been illustrated and described, it is to be understood that the embodiments are not limited to the precise construction and components disclosed herein and that various modifications, changes and variations may be made in the arrangement, operation and details of the method and apparatus of the present disclosure disclosed herein without departing from the spirit and scope of the disclosure as defined in the appended claims.

What is claimed is:

1. A cable between a transmitter of a first device and a receiver of a second device, comprising:
   a set of conductors extending from one end of the cable configured to couple with the transmitter to another end of the cable configured to couple with the receiver;
   a switch coupled to at least one of the set of conductors; and
   a circuit coupled to the switch and configured to control the switch to transition the cable from a first signal mode to a second signal mode, a path established via the set of conductors in the first signal mode to communicate first data between the circuit and either the transmitter or the receiver, and another path established via the set of conductors in the second signal mode to communicate second data between the transmitter and the receiver, wherein the first data includes information associated with at least one characteristic of the cable.

2. The cable of claim 1, wherein the circuit is configured to control the switch to transition the cable from the second signal mode to the first signal mode.

3. The cable of claim 1, wherein the circuit is configured to cause the switch to couple at least one of the set of conductors with the circuit in the first signal mode.

4. The cable of claim 1, wherein the first data includes information derived from a measurement of at least one property of a signal passing through the set of conductors.

5. The cable of claim 4, wherein the at least one property of the signal passing through the set of conductors includes at least one of: voltage level, current level, power of the signal, frequency components of the signal, attenuation components of the signal, and a degree of skewing of the signal.

6. The cable of claim 1, wherein the at least one characteristic of the cable includes at least one of: impedance, length, operable frequency range, measured degree of crosstalk between the set of conductors, electromagnetic interference, and common-mode radiation.

7. The cable of claim 6, wherein the first data is stored in a memory of the circuit during manufacturing of the cable.

8. The cable of claim 1, wherein the end of the cable configured to couple to either the transmitter or the receiver is further configured to couple with the transmitter or the receiver through a coupling with a second cable.

9. The cable of claim 1, wherein the switch is configured to be controlled by either the receiver or the transmitter.

10. The cable of claim 1, wherein the circuit is configured to cause the switch to disconnect at least one of the set of conductors between the transmitter and the receiver in the first signal mode.

11. The cable of claim 1, further comprising:
    a voltage regulator coupled to at least one of the set of conductors and configured to convert a voltage level of a signal carrying the second data from a first voltage level to a second voltage level.

12. The cable of claim 1, wherein the circuit is configured to control the switch to transition the cable between the first signal mode and the second signal mode at a predetermined time interval.

13. A cable between a transmitter of a first device and a receiver of a second device, comprising:
    a set of conductors extending from one end of the cable configured to couple with the transmitter to another end of the cable configured to couple with the receiver;
    a switch coupled to at least one of the set of conductors, the switch configured to be controlled by either the receiver or the transmitter; and
    a circuit coupled to the switch and configured to control the switch to transition the cable from a first signal mode to a second signal mode, a path established via the set of conductors in the first signal mode to communicate first data between the circuit and either the transmitter or the receiver, and another path established via the set of conductors in the second signal mode to communicate second data between the transmitter and the receiver.

14. The cable of claim 13, wherein the circuit is configured to cause the switch to disconnect at least one of the set of conductors between the transmitter and the receiver in the first signal mode.

15. The cable of claim 13, further comprising:
    a voltage regulator coupled to at least one of the set of conductors and configured to convert a voltage level of a signal carrying the second data from a first voltage level to a second voltage level.

16. The cable of claim 13, wherein the circuit is configured to control the switch to transition the cable between the first signal mode and the second signal mode at a predetermined time interval.

17. The cable of claim 13, wherein the first data includes information derived from a measurement of at least one property of a signal passing through the set of conductors, the at least one property of the signal includes at least one of: voltage level, current level, power of the signal, frequency components of the signal, attenuation components of the signal, and a degree of skewing of the signal.

18. A cable between a transmitter of a first device and a receiver of a second device, comprising:
- a set of conductors extending from one end of the cable configured to couple with the transmitter to another end of the cable configured to couple with the receiver;
- a switch coupled to at least one of the set of conductors; and
- a circuit coupled to the switch and configured to control the switch to transition the cable from a first signal mode to a second signal mode, a path established via the set of conductors in the first signal mode to communicate first data between the circuit and either the transmitter or the receiver, and another path established via the set of conductors in the second signal mode to communicate second data between the transmitter and the receiver, the circuit configured to cause the switch to disconnect at least one of the set of conductors between the transmitter and the receiver in the first signal mode.

19. The cable of claim 18, further comprising:
- a voltage regulator coupled to at least one of the set of conductors and configured to convert a voltage level of a signal carrying the second data from a first voltage level to a second voltage level.

20. The cable of claim 18, wherein the circuit is configured to control the switch to transition the cable between the first signal mode and the second signal mode at a predetermined time interval.

21. The cable of claim 18, wherein the first data includes information derived from a measurement of at least one property of a signal passing through the set of conductors, the at least one property of the signal includes at least one of: voltage level, current level, power of the signal, frequency components of the signal, attenuation components of the signal, and a degree of skewing of the signal.

22. A cable between a transmitter of a first device and a receiver of a second device, comprising:
- a set of conductors extending from one end of the cable configured to couple with the transmitter to another end of the cable configured to couple with the receiver;
- a switch coupled to at least one of the set of conductors;
- a circuit coupled to the switch and configured to control the switch to transition the cable from a first signal mode to a second signal mode, a path established via the set of conductors in the first signal mode to communicate first data between the circuit and either the transmitter or the receiver, and another path established via the set of conductors in the second signal mode to communicate second data between the transmitter and the receiver; and
- a voltage regulator coupled to at least one of the set of conductors and configured to convert a voltage level of a signal carrying the second data from a first voltage level to a second voltage level.

23. The cable of claim 22, wherein the circuit is configured to control the switch to transition the cable between the first signal mode and the second signal mode at a predetermined time interval.

24. The cable of claim 22, wherein the first data includes information derived from a measurement of at least one property of a signal passing through the set of conductors, the at least one property of the signal includes at least one of: voltage level, current level, power of the signal, frequency components of the signal, attenuation components of the signal, and a degree of skewing of the signal.

25. A cable between a transmitter of a first device and a receiver of a second device, comprising:
- a set of conductors extending from one end of the cable configured to couple with the transmitter to another end of the cable configured to couple with the receiver;
- a switch coupled to at least one of the set of conductors; and
- a circuit coupled to the switch and configured to control the switch to transition the cable from a first signal mode to a second signal mode, a path established via the set of conductors in the first signal mode to communicate first data between the circuit and either the transmitter or the receiver, and another path established via the set of conductors in the second signal mode to communicate second data between the transmitter and the receiver, the circuit configured to control the switch to transition the cable between the first signal mode and the second signal mode at a predetermined time interval.

\* \* \* \* \*